June 15, 1948.  A. BECHLER  2,443,220
GRIPPING DEVICE FOR AUTOMATIC LATHES
Filed Sept. 23, 1946
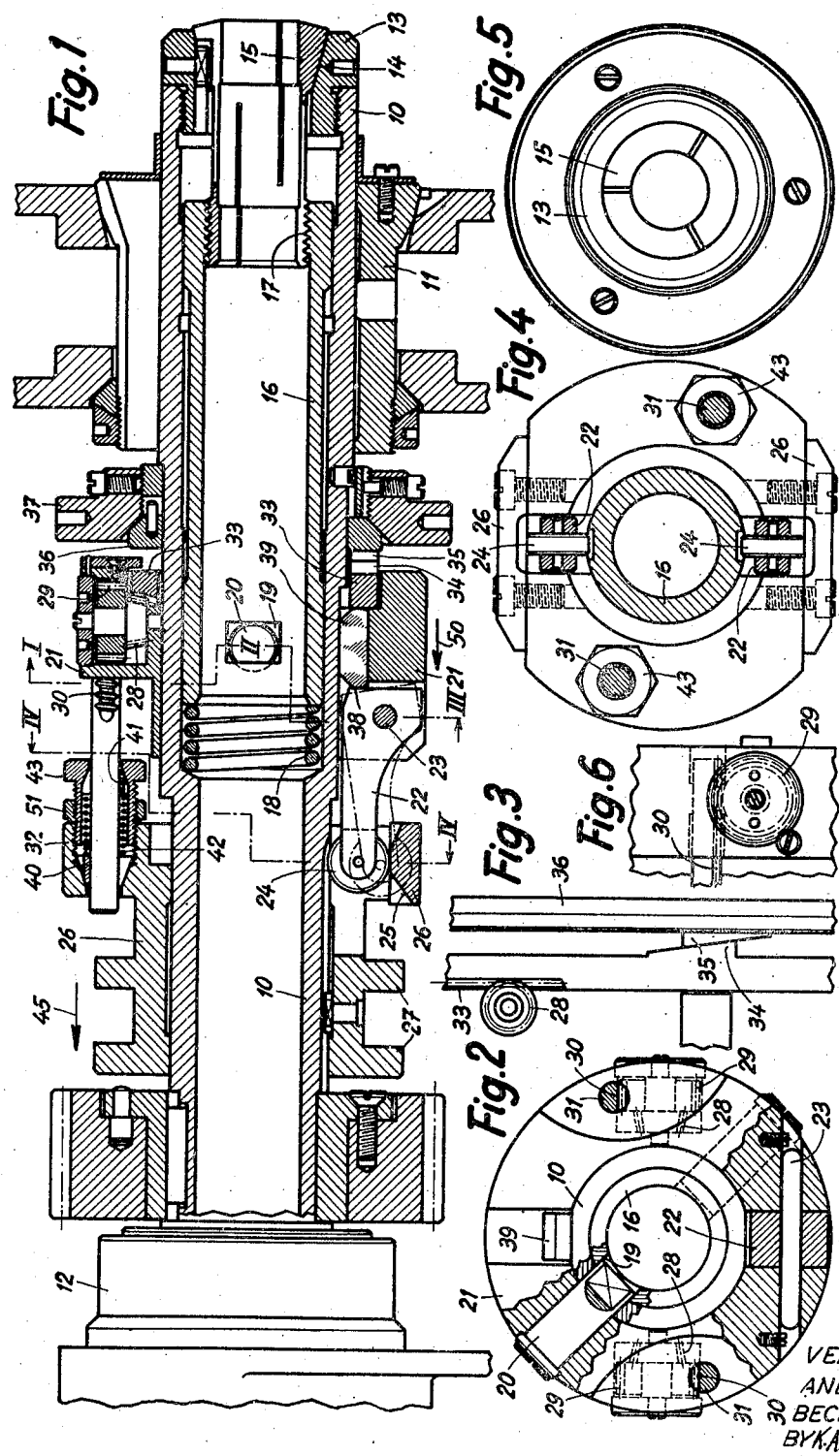
INVENTOR:
ANDRÉ BECHLER
BY K.A. [signature]
ATTORNEY.

Patented June 15, 1948

2,443,220

UNITED STATES PATENT OFFICE 2,443,220

GRIPPING DEVICE FOR AUTOMATIC LATHES

André Bechler, Moutier, Switzerland

Application September 23, 1946, Serial No. 698,812
In Switzerland June 17, 1946

4 Claims. (Cl. 279—1)

In automatic lathes gripping devices are used which couple the bar from which the pieces are formed to the headstock spindle by means of a split-collet type of chuck with conical head engaging with a corresponding conical bore in the nose of the said spindle, the gripping being by a relative displacement of the spindle and the chuck, causing the jaws to close.

The relative displacement in question is transmitted by a dog clutch gripping device mounted concentrically on the headstock spindle, whose axial movement, given by the lathe cam shift, acts on levers pivoted in a sleeve, fulcruming on a fixed point on the headstock spindle and consequently causing an axial movement of the said sleeve. This sleeve has one or more dogs inserting through the wall of the headstock spindle into a spindle acting directly on the split collet chuck.

Such devices are known. They possess the advantage of holding the bar perfectly solid with the headstock spindle, if the bar has a diameter corresponding exactly to the diameter for which the chuck has been adjusted. In practice, however, it is hardly possible to obtain bars of absolutely uniform outside diameter; the amount of tolerance allowed in material found on the market is of a magnitude of several tenths of a millimetre and such differences are quite sufficient to influence the correct gripping of the bar, so that should the latter undergo great strain on turning, slipping will result, giving rise to unaccurate work.

The dripping device according to the present invention is of the same type as the one described above. It is characterised by the fact that it comprises at least one inclined surface interposed between two parts of a series of organs between the fixed point on which the levers fulcrum and the sleeve in which the latter are pivoted and whose position is determined by a feeler device under the influence of the diameter of the bar.

With the device according to this invention, the initial position of the gripping mechanism can be varied in relation to the diameter of the bar, so that perfect regularity in the action of the levers is obtained, for the latter will always be actuated from the point at which the split collet chuck holds the bar lightly to the extent corresponding to the adjustment of a braking device.

The attached drawing shows, by way of example, and to the extent necessary to the understanding of the invention, a gripping device for automatic lathes according to the present invention.

Fig. 1 is a longitudinal section of the device through the headstock spindle axis, the driving mechanism being left out.

Fig. 2 is a cross sectional view of the same along the lines I—II—III in Fig. 1.

Fig. 3 represents the evolution of two circular parts of the same, of which there will be question later on.

Fig. 4 is a cross sectional view of the device along the line IV—IV in Fig. 1.

Fig. 5 is an end view of the same and

Fig. 6, a plan view of a portion of certain parts shown in section in Fig. 1.

The hollow live spindle 10 of the automatic lathe, a portion only of which is represented, turns in the bearings 11 and 12. The detachable nose 13 of the live spindle is coned 14 internally for reception of a split collet type of chuck 15 seen in end-on view in Fig. 5 and opened and closed under the influence of axial movement transmitted to it by a tightening spindle 16 sliding within the live spindle 10 and having an internal thread 17 to take the interchangeable collet for bars of different size.

A spring 18 is interposed between a shoulder in the hollow live spindle and the said tightening spindle 16, with the purpose of pushing the collet out in order to open it. The tightening spindle is provided with a recess 19 in its side in which the dog 20 of the sleeve 21 mounted coaxially on the live spindle 10 and on which are pivoted at 180° to each other the lever 22 is inserted. These levers are pivoted at 23 and carry rollers 24 at the extremity of one of their arms. These rollers cooperate with bevelled faces 25 provided at the front end of the controlling sleeve 26 of the dog-clutch gripping device. This sleeve is moreover formed by a guide-wheel 27 with circular groove in which a forked controlling lever, which is not represented, rides, with a view to sliding the said sleeve along the live spindle 10, thus operating the dog-clutch gripping device.

A bevel-wheel 28 integral with an ordinary pinion 29 is pivoted in a recess in the tightening sleeve 21. The pinion 29 meshes with teeth 30 cut in the plunger shaped dog 31 of the dog-clutch, made to cooperate with a braking device 32 described further down. The bevel-wheel 28 meshes with teeth cut at the periphery in one of the faces of a ring 33 which can be made to turn on the live spindle 10 and to cooperate with a second ring 36 whose periphery is a portion of a sphere through the medium of helicoidal surfaces 34, 35 provided on the said rings, respectively. The latter ring 36 is adjusted in a spherical recess of a third ring 37 fixed to the live spindle 10 in some known manner. This ring 37 forms the fixed point referred to in the first claim.

The evolution of the rings 33 and 36 is shown in Fig. 3. It can be seen that the relative movement of these parts by turning the bevel-wheel 28 causes the helicoidal surfaces to slide one over the other with the result that the rings 33 and 36 are forced apart, thus increasing the distance separating the fixed ring 37 and the point of contact of the lever 22. Now, this point of contact stands in mechanical relation to a series of organs, i. e., the rings 37, 36 and 33 and an intermediary piece 39, in such a way that when the rollers 24 of the levers 22 are brought nearer the live spindle 10 by the action of the bevelled faces 25, the said levers fulcruming medianly on the ring 37 will displace the sleeve 21 in the direction of the arrow-head 50.

The plunger 31 passes through the box 32 of the braking device containing two conical split bushes 40 and 41 and a helical spring 42 which constantly presses the latter on to the cylindrical surface of the plunger 31. The pressure of the spring can be regulated by means of a gland 43 in which one end of the said spring is lodged. The position of this gland is fixed by means of a lock nut 51. The spring is compressed by screwing up the gland. Consequently, the conical split bushes 40 and 41 will close more tightly about the plunger 31, thus braking any motion imparted to the latter.

The device represented functions as follows:

The drawing shows the device in the gripping position with the bar of work, which is not represented, made solid with the collet chuck 15. When the collet is open, the position of the levers is shown by dotted lines; the rollers are not yet in a position to be acted upon by the bevelled faces of the controlling sleeve 26 and the point of contact 38 is, therefore, not touching the intermediary piece 39, so that the tightening sleeve 21 is free. As a result, the spring 18 pushes the tightening spindle 16 with collet 15 forward, disengaging the collet-head from its coned-seating 14 and consequently loosening the bar.

In similar devices generally in use, the bar is freed in this very position by a back movement of the bearings carrying the live spindle 10 and by the blockage of the end of the said bar.

To grip the bar in the chuck, the forked controlling lever arm, which is not represented, directed by the lathe cam shaft, pushes the controlling sleeve 26 in the direction of the arrow head 45. Before the rollers come into actual contact with the bevelled faces 25 of the controlling sleeve, the latter transmits its motion to the plunger which, owing to the friction between the parts 40, 41, and the latter, is coupled to it. The plunger, therefore, acts through the medium of its teeth 30, the pinion 29, the bevel-wheel 28, on the ring 33, with the result that a relative rotative displacement of the helicoidal surfaces 34 and 35 is produced, which has the effect of increasing the distance separating the rings 36 and 33. The ring 33 bearing on the opposite ring 36 pushes the tightening sleeve 21 which, through the medium of the dogs 20, pulls the tightening spindle for the split collet chuck likewise in the direction of the arrowhead 45, with a view of bringing the head of the collet up against the coned surface in the nose of the live spindle, thus causing the jaws of the chuck to close on the bar. Once the initial adjustment of the chuck with respect to the diameter of the bar has been effected, the closing of the chuck on the bar will check further axial movement of the plunger 31, so that the friction of the braking device is overcome by the forward push of the controlling sleeve. The chuck grips the bar lightly until the rollers 24 are acted upon by the bevelled edges 25 of the said sleeve, when they will be moved towards the spindle. On coming into contact with the intermediary piece 39 at the point of contact 38, the fulcrums of the levers change their positions from the pivots 23 to the points of contact 38, so that the force is transmitted to the controlling sleeve 21 in the direction of its axis, conveying it through the medium of the dogs 20 to the split collet chuck 15, closing it effectively on the bar of work.

It follows from the foregoing description that the levers come into effective operation at the point where the jaws of the chuck are already in contact with the bar, for the gripping invariably takes place under the same influence of the rollers moving through a constant diametrical course, whatever may be the initial position of the chuck. The gripping is always effective and no undesirable slipping is to be feared.

What I claim is:

1. In a gripping device for automatic lathes, a live spindle, a work-gripping collet mounted on said live spindle, a tightening tube fixed to said collet and slidably arranged in said live spindle, a tightening member slidably mounted on said live spindle, a means establishing drive connection between said tightening tube and said tightening member, levers pivoted on said tightening member to abut on said live spindle, a control member slidably mounted on said live spindle to control said levers, an adjustable member abutting on said live spindle and on said tightening member to displace the latter on being adjusted, driving means in driving connection with said adjustable member to adjust the latter for displacement of said tightening member along said live spindle, and a coupling designed to establish automatically driving connection between said control member and said driving means to reach a certain displacement of said tightening member by means of said adjustable members before said collet is tightened by said levers.

2. In a gripping device for automatic lathes, a live spindle comprising a bearing surface, a work-gripping collet mounted on said live spindle, a tightening tube fixed to said collet and slidably arranged in said live spindle, a tightening member slidably mounted on said live spindle, a means establishing drive connection between said tightening tube and said tightening member, levers pivoted on said tightening member to abut on said live spindle, a control member slidably mounted on said live spindle to control said levers, a rotatable ring traversed by said live spindle, abutting on said tightening member and having an inclined surface abutting on said bearing surface to displace said tightening member on said rotatable ring being rotated, driving means in driving connection with said rotatable ring to rotate the latter for displacement of said tightening member along said live spindle, and a coupling designed to establish automatically driving connection between said control member and said driving means to reach a certain displacement of said tightening member by means of said rotatable ring before said collet is tightened by said levers.

3. In a gripping device for automatic lathes, a live spindle comprising a bearing surface, a work-gripping collet mounted on said live spindle, a tightening tube fixed to said collet and slidably arranged in said live spindle, a tightening member slidably mounted on said live spindle, a means establishing drive connection between said tightening tube and said tightening member, levers pivoted on said tightening member to abut on said live spindle, a control member slidably mounted on said live spindle to control said levers, a rotatable ring traversed by said live spindle, abutting on said tightening member and having a toothing and an inclined surface abutting no said bearing surface to displace said tightening member on said rotatable ring being rotated, a first gear wheel mounted on said tightening member and engaging said toothing, a second gear wheel coupled with said first gear wheel, a toothed plunger meshing with said second gear wheel, and an adjustable brake device fixed to said control member and engaging said plunger so as to establish driving connection between said control member and said second gear wheel to reach a certain displacement of said tightening member by means of said rotatable ring before said collet is tightened by said levers.

4. In a gripping device for automatic lathes, a live spindle comprising a bearing surface, a work-gripping collet mounted on said live spindle, a tightening tube fixed to said collect and slidably arranged in said live spindle, a tightening member slidably mounted on said live spindle, a means establishing drive connection between said tightening tube and said tightening member, levers pivoted on said tightening member to abut on said live spindle, a control member slidably mounted on said live spindle to control said levers, a rotatable ring traversed by said live spindle, abutting on said tightening member and having a toothing and an inclined surface abutting on said bearing surface to displace said tightening member on said rotatable ring being rotated, a first gear wheel mounted on said tightening member and engaging said toothing, a second gear wheel coupled with said first gear wheel, a toothed plunger meshing with said second gear wheel, and a brake device fixed to said control member, comprising bushes, a spring, pressing said bushes against said plunger so as to establish driving connection between said control member and said second gear wheel to reach a certain displacement of said tightening member by means of said rotatable ring before said collet is tightened by said levers, and an adjustable gland receiving said spring for regulation of the pressure of said spring.

ANDRÉ BECHLER.

REFERENCES CITED

The following references are of record in the file of this patent:

UNITED STATES PATENTS

| Number | Name | Date |
| --- | --- | --- |
| 814,647 | Hanson | Mar. 6, 1906 |
| 905,518 | Hanson | Dec. 1, 1908 |
| 952,149 | Smith et al. | Mar. 15, 1910 |
| 1,604,113 | Drissner et al. | Oct. 26, 1926 |
| 1,864,786 | Wilkins | June 28, 1932 |
| 2,410,807 | Brennen | Nov. 12, 1946 |

FOREIGN PATENTS

| Number | Country | Date |
| --- | --- | --- |
| 28,271 | Great Britain | 1910 |